Feb. 26, 1924.  
T. O. BAKKEN  
CHICKEN WATERER AND FEEDER  
Filed June 29, 1923

Inventor
Tollef O. Bakken
By Albert W. Freeman
Attorney

Feb. 26, 1924.
T. O. BAKKEN
1,484,860
CHICKEN WATERER AND FEEDER
Filed June 29, 1923
2 Sheets-Sheet 2
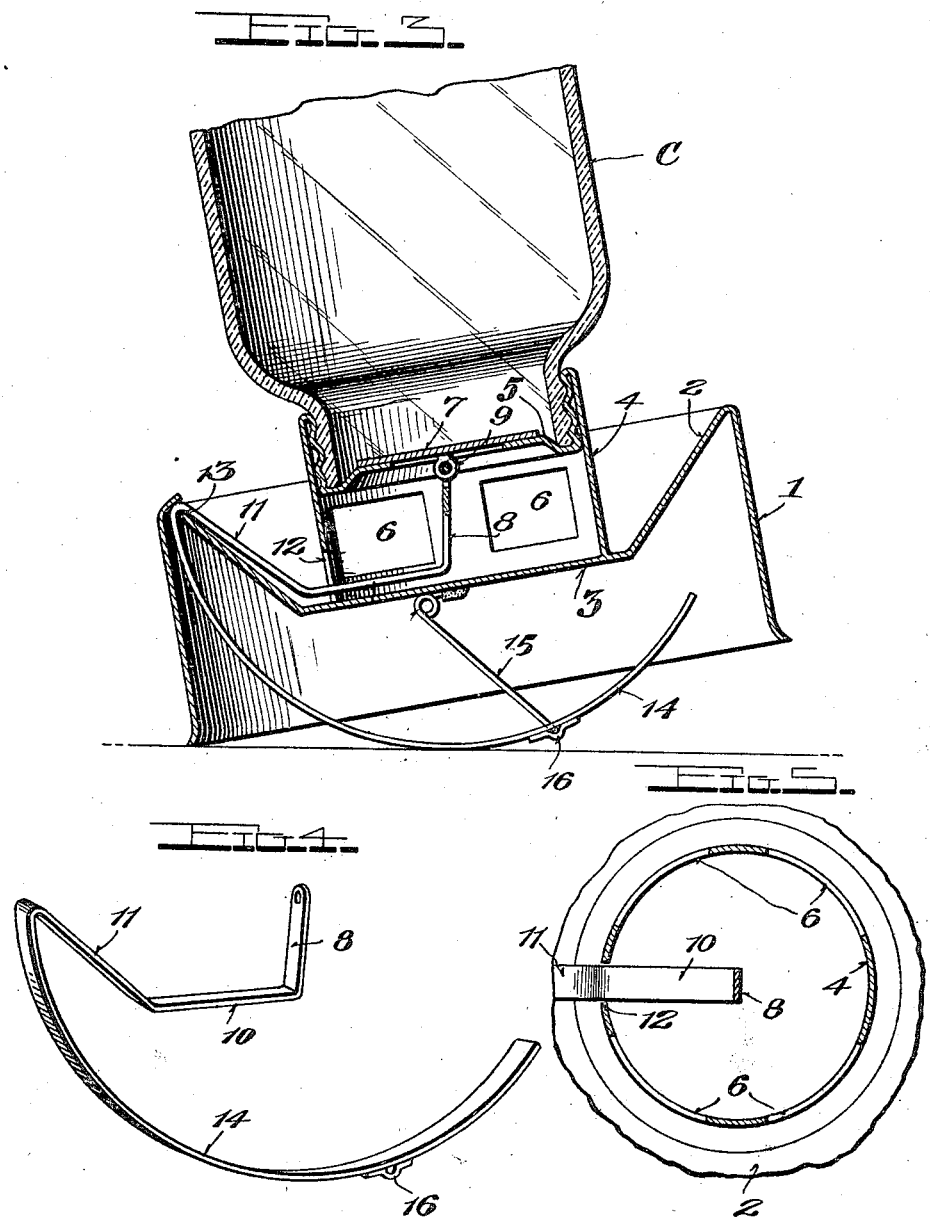

Patented Feb. 26, 1924.

1,484,860

UNITED STATES PATENT OFFICE.

TOLLEF O. BAKKEN, OF BODE, IOWA.

CHICKEN WATERER AND FEEDER.

Application filed June 29, 1923. Serial No. 648,512.

*To all whom it may concern:*

Be it known that I, TOLLEF O. BAKKEN, a citizen of the United States, residing at Bode, in the county of Humboldt and State of Iowa, have invented certain new and useful Improvements in Chicken Waterers and Feeders, of which the following is a specification.

This invention relates to certain new and useful improvements in chicken waterer and feeder, and the primary object thereof is to provide a device of this type wherein the water or feed is prevented from entering the water or feed trough excepting when the latter is placed upon the ground or other supporting surface, and wherein and in the latter position, the water or feed will be automatically released to permit the entry of same into the trough.

A further object of the invention is to provide automatically operating means for controlling the feed of the water or feed, which is extremely simple in character and positive in operation, involving a minimum of parts which can be easily produced and assembled and at a low cost of manufacture.

A still further object of the invention is to provide a device of this character which merely requires inversion of the structure and threading thereof into engagement with the feed or water container, followed by restoring of the parts to normal position and placement of the device on the ground or other support, thereby automatically effecting movement of the feed or water into the trough.

The invention has still further and other objects which will be later set forth and of themselves manifested in the course of the following description.

In the drawings:—

Figure 3, is a view similar to Figure 1 showing the base about to be placed in normal or operative position;

Figure 4, is a detail perspective view of the valve operating arm, and

Figure 5, is a section on line 5—5 of Figure 1.

Figure 1:
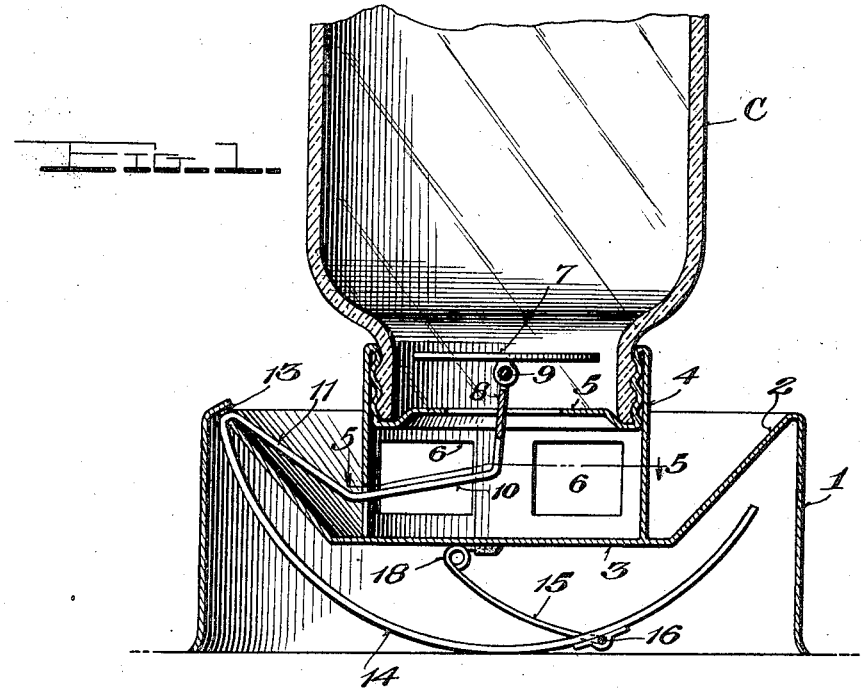
Figure 1, is a vertical sectional view showing the parts in operative or feeding position.
Figure 2:
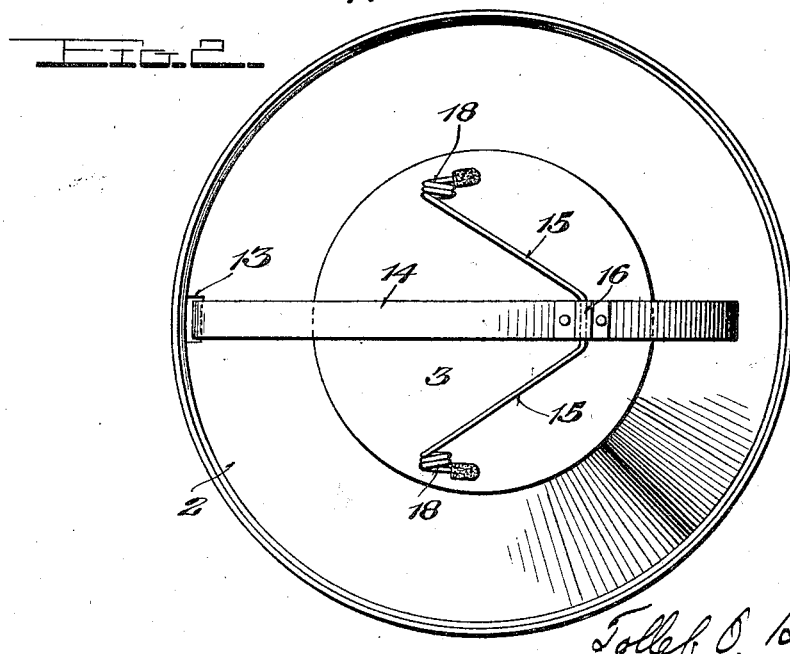
Figure 2, is a bottom plan view of the base.

In proceeding in accordance with the present invention, a base is employed having a vertical rim 1 open at its bottom and formed to seat or rest upon the ground or any other support. The top portion of the rim has a downwardly inclined wall 2 extending to a bottom 3, the wall 2 and bottom 3 conjointly affording a feed trough or channel, which latter as also the rim, are preferably of circular form.

Extending vertically and upwardly from the bottom 3, is an interiorly threaded collar 4, which may be of a diameter and have a gage of threads, which adapt same for use with fruit jars C, commonly termed Mason fruit jars. Obviously however, any preferred form of container C may be used, if desired, in lieu of a fruit jar.

The interior of the collar 4 is provided with a ring-like valve seat 5 located between the top and bottom of the collar and the open center of which affords a means of ingress of the water or feed into the trough through a series of openings 6 provided therefor throughout the circumference of the collar 4.

A circular valve 7 of the disk type is engageable with the seat 5 and is of diameter to enable same to be moved upwardly into the neck of the container. The valve 7 when engaged with the seat 5, prevents water or feed from entering the trough and in order to automatically unseat the valve, means is provided including an arm having a vertical part 8 which is disposed within the collar 4 and is connected by an eye 9 to the valve, a horizontal part 10, which is engageable with the bottom 3, and an inclined part 11 which is engageable with the inclined wall 2 of the trough. The horizontal part 10 of the arm operates through a guide slot 12 provided therefor in the collar. The arm by extending through a slot 13 in the trough top is pivotally related to the trough and has a somewhat J-shaped operating end 14, which latter is preferably formed integral with the parts 8, 10 and 11 of the arm. In order to tension the arm a preferably V-shaped spring 15 is employed, movably secured at its apex at 16 to the free end of the arm part 14 and having coiled ends 18 which may be soldered or otherwise rigidly secured to the bottom 3.

In operation, the container filled with water or feed, is held upright, the base inverted and the two parts then threadedly connected, whereupon the parts are restored to vertical position, in which it will be noted that the curved operating end 14 of the arm projects below the bottom of the base, and upon placement of the latter onto a support, as depicted in Figure 3, the arm will be caused to move up into the base, effecting automatic unseating of valve 5 and the egress of the feed or water into the trough. Should the trough be accidentally or otherwise moved out of its vertical position or bodily raised up from the ground the valve will be automatically moved to closed position, due to the action of the spring.

What is claimed is:—

1. In a poultry feeder, a base having a trough, an apertured collar extending upwardly from the trough bottom and being threaded at its upper end, a container threaded into engagement with the collar, a valve seat in the collar above the aperture thereof, a valve engageable with the seat, an arm having a vertical part disposed in the collar and having the upper end thereof connected to the valve and having parts formed to seat on the trough bottom and sides, said trough having a slot adjacent its top edge, said arm having an operating end of substantially J-shape and having a part thereof extending through said slot of the trough to pivotally connect the arm to the trough, and a V-shaped spring movably connected at its apex to the arm and at its ends to the trough bottom to cause the curved free end of the operating arm to project below the bottom of the base and to effect sealing of the valve when the base occupies non-vertical position.

2. In a poultry feeder, a base having a trough, an apertured collar extending upwardly from the trough bottom and being threaded at its upper end, a container threaded into engagement with the collar, a valve seat in the collar above the aperture thereof, a valve engageable with the seat, an arm having a vertical part disposed in the collar and having the upper end thereof connected to the valve and having parts formed to seat on the trough bottom and sides, said trough having a slot adjacent its top edge, said arm having an operating end of substantially J-shape and having a part thereof extending through said slot of the trough to pivotally connect the arm to the trough, and means to tension the arm to cause the curved free end of the operating arm to project below the bottom of the base and to effect seating of the valve when the base occupies non-vertical position.

3. In a poultry feeder, a base having a trough, a container, an apertured collar formed for connection to the container carried by the trough bottom and having an outlet for the container contents, a valve controlling said outlet, and tensioned operating means connected to the valve and having a part movable below the base to effect unseating of the valve when said means is engaged with a support and to effect seating of the valve when the base is in non-vertical relation to the support.

4. In a poultry feeder, a trough, a container connected to the trough, means to control the feed of material from the container to the trough, and automatic means connected to the controlling means for enabling feed of the material to the trough throughout the time the container and trough remain in a vertical position and for shutting off the feed when the said parts are out of vertical position.

5. In a poultry feeder, a trough, a container connected to the trough, means to control the feed of material from the container to the trough, and automatic means operable by contact with a supporting surface and connected to the controlling means for enabling feed of the material to the trough throughout the time the container and trough remain in a vertical position and for shutting off the feed when the said parts are out of vertical position.

6. In a poultry feeder, a trough, a container communicating therewith, and automatic ground engaging means movable below the bottom of the trough for shutting off said communication when the parts are out of ground engaging or vertical position.

7. In a poultry feeder, a trough formed to seat on a supporting surface in a normally vertical position thereon, means to supply material to the trough fixedly connected to the latter, and means to control the supply engageable with the supporting surface to maintain the supply open throughout the time the trough remains in its said normal vertical position, and being automatically movable to close the supply upon the trough being moved out of its said normal vertical position.

8. In a poultry feeder, a trough formed to seat on and be supported by the ground, means to supply material to the trough, means to control the supplying means, and automatic means engageable with the ground to hold the controlling means open and which when the trough is out of normal position in engagement with the ground projects below the bottom of the trough and moves the controlling means to closed position.

In testimony whereof I affix my signature.

TOLLEF O. BAKKEN.